(12) United States Patent
Maeda (10) Patent No.: US 7,261,497 B2
(45) Date of Patent: Aug. 28, 2007

(54) THROW-AWAY INSERT AND MILLING CUTTER USING THROW-AWAY INSERT

(75) Inventor: Kazuo Maeda, Itami (JP)

(73) Assignee: Sumitomo Electric Hardmetal Corp., Itami, Hyogo (JP)

( * ) Notice: Subject to any disclaimer, the term of this patent is extended or adjusted under 35 U.S.C. 154(b) by 0 days.

(21) Appl. No.: 11/462,643

(22) Filed: Aug. 4, 2006

(65) Prior Publication Data

US 2007/0031200 A1 Feb. 8, 2007

(30) Foreign Application Priority Data

Aug. 8, 2005 (JP) ............................. 2005-229573

(51) Int. Cl.
*B23C 5/20* (2006.01)
(52) U.S. Cl. ........................... 407/113; 407/42; 407/48
(58) Field of Classification Search ................ 407/113, 407/48, 42; *B23C 5/20*
See application file for complete search history.

(56) References Cited

U.S. PATENT DOCUMENTS

| | | | | |
|---|---|---|---|---|
| 5,078,550 A | * | 1/1992 | Satran et al. | ................. 407/34 |
| 5,145,295 A | * | 9/1992 | Satran | ........................ 407/113 |
| 5,947,650 A | * | 9/1999 | Satran et al. | ................. 407/113 |
| 6,193,446 B1 | * | 2/2001 | Astrom et al. | ............... 407/114 |
| 6,196,770 B1 | * | 3/2001 | Astrom et al. | ................ 407/40 |
| 6,293,737 B1 | * | 9/2001 | Satran et al. | ................ 407/113 |
| 6,503,028 B1 | * | 1/2003 | Wallstrom | .................... 407/35 |
| 6,929,427 B2 | * | 8/2005 | Satran | .......................... 407/42 |
| 7,040,844 B1 | * | 5/2006 | Daiguji | ....................... 407/113 |
| 2004/0131431 A1 | * | 7/2004 | Satran | ......................... 407/40 |

FOREIGN PATENT DOCUMENTS

| | | |
|---|---|---|
| JP | 2531557 Y2 | 4/1997 |
| JP | 11-333616 A | 12/1999 |

* cited by examiner

*Primary Examiner*—Monica Carter
*Assistant Examiner*—Sara Addisu
(74) *Attorney, Agent, or Firm*—Ditthavong Mori & Steiner, P.C.

(57) ABSTRACT

A throw-away insert includes: an upper and bottom surface; two side surfaces; two end surfaces; a main cutting section formed from a ridge line positioned at the intersection between the side surfaces and the upper surface; a secondary cutting section formed from a ridge line positioned at the intersection between the end surfaces and the upper surface; an axial support surface supported by an insert pocket of a cutter body; and noses formed at the corners of the upper surface. The corner angles of the noses when seen from above are essentially right angles. The axial support surface is formed as a section of the end surface. The secondary cutting section is parallel to the ridge line at the upper end of the axial support surface and the bottom surface. The upper end of the axial support surface is positioned so that it is projected more in the direction of the longitudinal axis of the main cutting section than the ridge line of the upper end.

7 Claims, 6 Drawing Sheets

THROW-AWAY INSERT AND MILLING CUTTER USING THROW-AWAY INSERT

INCORPORATION BY REFERENCE

The present application claims priority under 35 U.S.C. §119 to Japanese Patent Application No. 2005-229573 filed on Aug. 8, 2005. The content of the application is incorporated herein by reference in its entirety.

BACKGROUND OF THE INVENTION

1. Field of the Invention

The present invention relates to a throw-away insert used in the milling of right-angle corners and the like and a milling cutter, e.g., an end mill or corner mill, that uses this insert.

2. Description of the Background Art

Japanese Utility Model Publication Number 2531557 and Japanese Laid-open Patent Publication Number Hei 11-333616 describes an example of a throw-away insert (also referred to below simply as insert) used with a negative/positive orientation to cut right-angle corners. Negative/positive orientation refers to mounting an insert so that a radial rake of the insert is negative and the axial rake is positive.

The insert described in Japanese Utility Model Publication Number 2531557 forms a roughly parallelogram shape and is a positive insert with a side surface intersecting at an acute angle with an upper surface serving as the rake face. The acute-angle corner side of the upper surface is used to cut the corner of the workpiece. The insert disclosed in Japanese Laid-Open Patent Publication Number Hei 11-333616 forms a roughly rectangular shape. A ridge line positioned at the intersection of a side surface and an upper surface serves as a main cutting section, and an end surface of a sloped surface axially projected from an end of a body serves as a secondary cutting section.

Throw-away inserts used for cutting are primarily sintered inserts. Sintered inserts are made by filling a mold with a raw material powder, shaping it with a press, and sintering the obtained shaped body. During sintering, changes in dimensions are unavoidable. Depending on the shape of the insert, powder density at different sections can vary during the shaping of the powder. The inserts obtained by sintering this type of shaped body have reduced dimensional accuracy after sintering, resulting in inferior cutting accuracy and attachment accuracy when attaching to a cutter body.

With positive inserts that use a parallelogram shape as the basic shape, such as the one described in Japanese Utility Model Publication Number 2531557, powder tends to fill up less at the acute-angle corners compared to the obtuse-angle corners. This leads to different amounts and densities for the powder that fills the acute-angle nose sections and the obtuse-angle nose sections, resulting in variations in the dimension changes taking place during sintering. This reduces the dimensional accuracy after sintering.

Also, the insert in the Japanese Laid-open Patent Publication Number Hei 11-333616 may be considered to have less powder density variation than the insert of the Japanese Utility Model Publication Number 2531557. However, since the ridge line axially projected from the end of the body is used as the secondary cutting section and since the sloped surface forming the secondary cutting section is used to axially support the insert, the small area of the sloped surface is further reduced when the secondary cutting section is damaged, leading to reduced axial support stability.

Also, since the surface pressure of the support surface is increased by the reduction in the support surface, the tool life of the insert and the cutter body and the like may be reduced as well.

The object of the present invention is to overcome the problems of the inserts described in Japanese Utility Model Publication Number 2531557 and Japanese Laid-open Patent Publication Number Hei 11-333616 and to improve the dimensional accuracy of a sintered insert by reducing variations in powder density while using a structure that does not sacrifice support stability when there is damage to a secondary cutting section.

SUMMARY OF THE INVENTION

In order to overcome the problems described above, the present invention provides the following. A throw-away insert including: an upper surface; a bottom surface formed with four corners; two side surfaces connected to a first set of two parallel sides of the bottom surface; two sloped end surfaces connected to a second set of two parallel sides of the bottom surface; a main cutting section formed from a ridge line positioned at an intersection between the side surface and the upper surface; a secondary cutting section formed from a ridge line positioned at an intersection between the end surface and the upper surface; an axial support surface supported by an insert pocket of a cutter body; and four nose sections formed at corners of the upper surface. Also, corner angles of the four corners as seen from a plane view of the insert are essentially right angles, and at least one nose section of the four nose sections is formed by combining the main cutting section and the secondary cutting section and a nose R. The axial support surface is formed from a section of the end surface. The secondary cutting section is parallel with the bottom surface and a ridge line at an upper end of the axial support surface and is projected further along a length axis of the main cutting section than the ridge line at the upper end of the axial support surface.

It can be preferable for the main cutting section to form a gentle curve that is a curve that expands outward when seen from a plane view. Also, with regard to the corner angle of the nose sections formed by combining the main cutting section and the secondary cutting section and the nose R and the corner angle of the nose sections formed by combining the main cutting section and the ridge line of the upper end of the axial support surface and the nose R, it can be preferable for the difference between the angles to be as small as possible. A range of 88 deg-91 deg for the corner angles of the former and a range of 90 deg-91 deg for the latter would be appropriate. For the corner angles of the nose sections of the present invention, angles that are off from 90 deg by no more than 2 deg are considered essentially right angles.

The nose sections formed by combining the main cutting section and the secondary cutting section and the nose R can be provided at two diagonal corners, so that the insert outline of the insert stays identical when the insert is rotated 180 deg around a center of the insert. Also, a radial support surface can be positioned at the side surface and to be essentially perpendicular to the axial support surface. The secondary cutting section and the ridge line connected to the secondary cutting section can be parallel to the bottom surface when seen from a bottom view of the insert. It would also be preferable for phases of the corners of the upper surface are in alignment with phases of the corners of the bottom surface.

According to another aspect, this throw-away insert is mounted in an insert pocket provided at an outer perimeter at an end of a cutter body so that: a secondary cutting section is positioned at an end; a main cutting section is positioned at an outermost perimeter section; an axial rake is positive; a radial rake is negative; a wall surface of a corner cut by the main cutting section is parallel with an axial center line of the cutter; and a bottom surface of a corner cut by the secondary cutting section is perpendicular to the axial center line of the cutter. The present invention also provides a milling cutter with the above structure.

In the insert of the present invention, the corner angles of the four nose sections are essentially right angles when seen from above, allowing powder to fill these nose sections easily. As a result, the conditions under which the powder fills the nose sections are uniform, allowing the powder to fill uniformly and reducing density variations. This restricts variations in dimensional changes (deformations) during sintering, thus improving dimensional accuracy and shape accuracy.

Also, the axial support surface of the insert is formed as a section of the end surface, and this axial support surface is provided at a position independent from the secondary cutting section. Thus, the area of the axial support surface is not reduced even if the secondary cutting section is damaged. This maintains the stability of axial support. As a result, cutting is made more stable and accurate, and increased support load caused by reduction in the area is prevented, thus improving the tool life of the insert and the cutter body.

Furthermore, the presence of the secondary cutting section, which cleans the bottom surface of the cut corner, improves the surface roughness of the bottom surface.

Other operations and advantages of preferred structures are described in the next section.

DETAILED DESCRIPTION OF THE INVENTION

Referring to FIG. 1 through FIG. 6, an embodiment of a throw-away insert according to the present invention will be described. A throw-away insert 1 shown in the figure includes: an upper surface 2; a flat, roughly rectangular bottom surface 3 formed with four corners; two side surfaces 4, 4 continuous with two parallel sides of the bottom surface 3; two end surfaces 5, 5 continuous with the other two parallel sides of the bottom surface 3; two long main cutting sections 6, 6; two secondary cutting section 7, 7 provided at two opposing corners; an axial support surface 8 supported by an insert pocket of a cutter body; four nose sections $9_{-1}$-$9_{-4}$ formed at the corners of the upper surface 2; an insert hole 10 for clamping; and a radial support surface 11 formed on the lower sides of side surfaces 4, 4.

Figure 3:
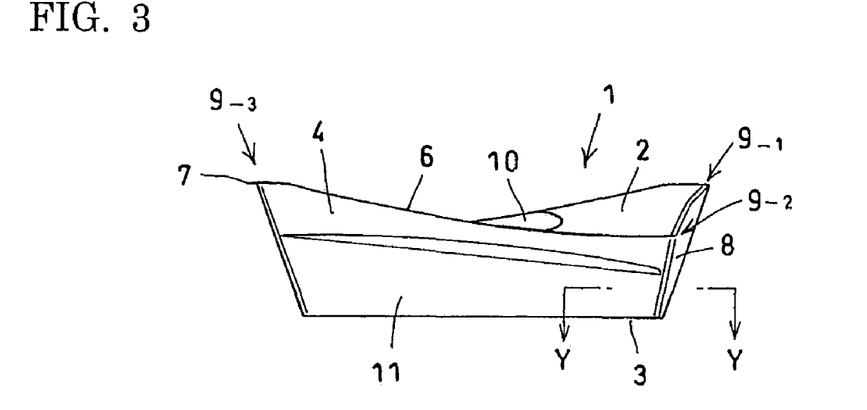
FIG. 3 is a side-view drawing of the insert from FIG. 1.

In the insert of this example, a height difference is present on the upper surface 2. In the upper surface 2, the nose sections $9_{-1}$, $9_{-3}$, which are at diagonal corners, have the highest positions. The region of the upper surface 2 along the main cutting section 6 forms a downward slope going from the nose section $9_{-1}$ to the nose section $9_{-4}$ as well as from the nose section $9_{-3}$ to the nose section $9_{-2}$. As shown in FIG. 3, this results in the main cutting section 6 forming a blade that is sloped relative to the bottom surface 3 when seen from the side.

The side surface 4 and the end surface 5 both form an acute angle with the upper surface 2. The main cutting section 6 is formed by the ridge line where the side surface 4 and the upper surface 2 intersect. The secondary cutting section 7 is formed by the ridge line where the end surface 5 and the upper surface 2 intersect.

Also, the axial support surface 8 is formed from a portion of the end surface 5. This axial support surface 8 is positioned away from the end surface 5 where it forms the secondary cutting section 7.

The nose sections $9_{-1}$, $9_{-3}$ are formed by combining the main cutting section 6 and the secondary cutting section 7 and an arcuate nose corner 12. Also, the nose sections $9_{-2}$, $9_{-4}$ are formed by combining the main cutting section 6, the ridge line 13 at the upper end of the axial support surface 8, and the arcuate nose corner 12.

Figure 6:
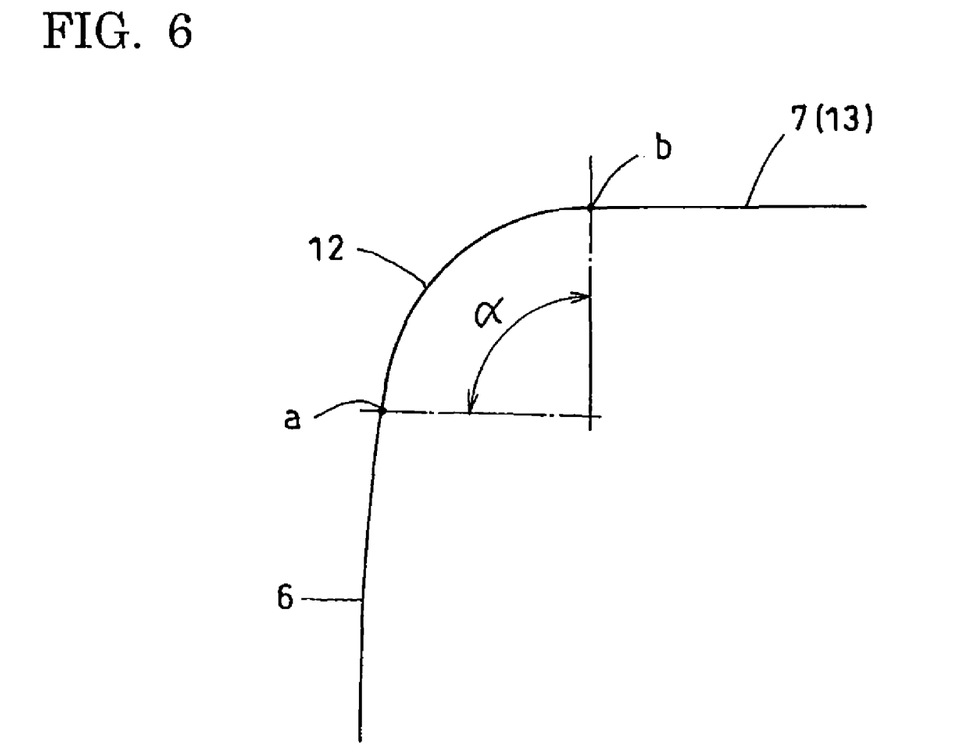
FIG. 6 is a plane-view detail drawing of a nose section of the insert from FIG. 1.

Also, the nose sections $9_{-1}$-$9_{-4}$ are formed so that corner angles α (see FIG. 1) of the insert when seen from above are essentially right angles. The corner angle α is indicated by the range over which the nose corner 12 is formed. As shown in FIG. 6, the corner angle refers to the range from a point a, where the nose corner 12 is connected to the main cutting section 6, and a point b, where it is connected to the ridge line 13 at the upper end of the axial support surface 8 or the secondary cutting section 7. While it would be ideal for the corner angles α of the four nose sections $9_{-1}$-$9_{-4}$ to all be 90 deg, the angles may be slightly off from 90 deg due to restrictions imposed by the shape of the main cutting section.

Figure 2:
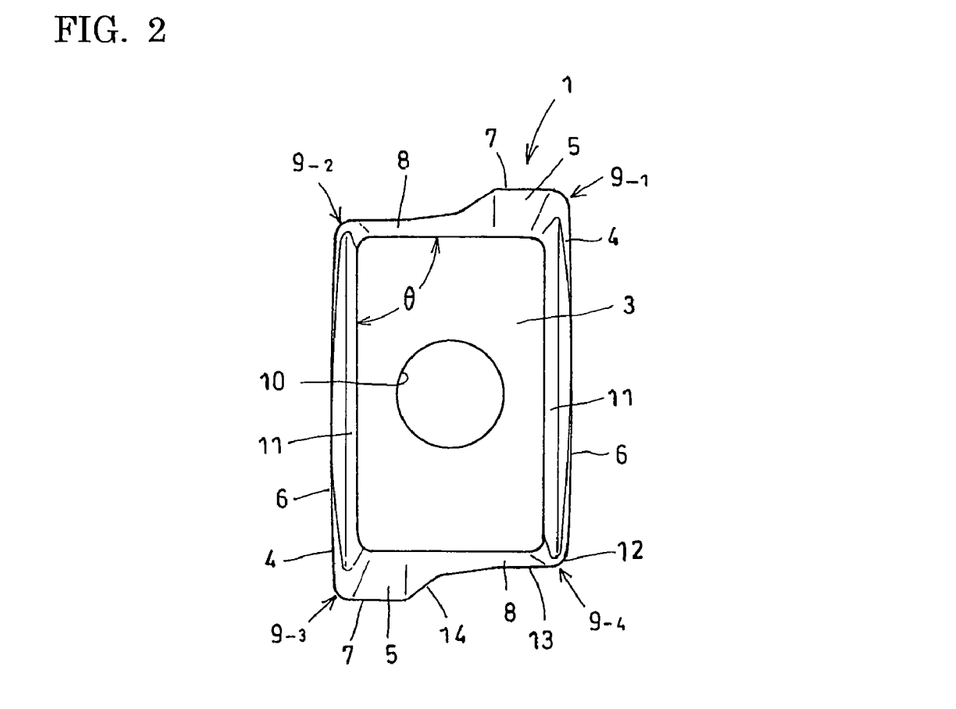
FIG. 2 is a bottom-view drawing of the insert from FIG. 1.

In order to improve corner cutting accuracy (the right angle of the wall surfaces) and to restrict variations in how the powder fills the mold during production, it would be preferable for the corner angle α for the nose sections $9_{-1}$, $9_{-3}$ to be in a range of 88 deg-91 deg and for the corner angle α for the nose sections $9_{-2}$, $9_{-4}$ to be in a range of 90 deg-91 deg. The more uniform the corner angles of the noses are, the more it is possible to fill the nose sections with powder in a uniform manner. This reduces variation in powder density and decreases variations in dimensions (deformation) during sintering. Referring to FIG. 2, the corner angles θ of the corners of the bottom surface 3 are formed in a similar manner as those of the nose sections.

Figure 1:
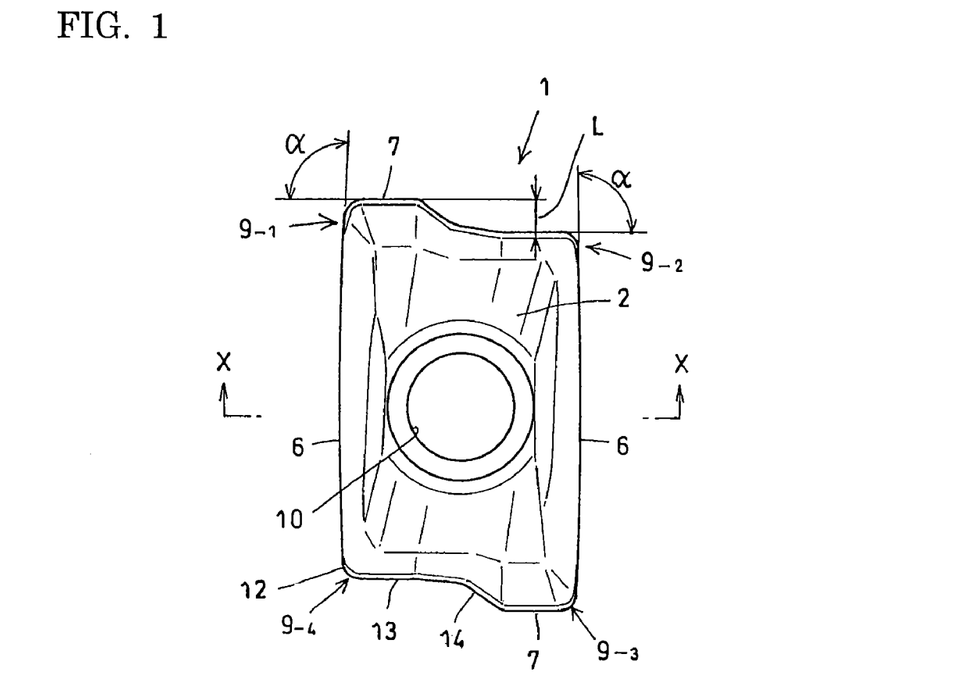
FIG. 1 is a plane drawing showing an example of a throw-away insert according to the present invention.

The secondary cutting section 7 is formed parallel with the ridge line 13 at the upper end of the axial support surface 8 as seen from above (FIG. 1). The secondary cutting section 7 projects further in the direction of the length of the main cutting section compared to the ridge line 13 at the upper end of the axial support surface 8 (the projection L shown in FIG. 1), and is positioned on a plane parallel to the bottom surface 3.

In addition, the main cutting section 6 is formed with a curve with a large arc radius (a small curvature) and expands outward with a gentle curve when seen from above (FIG. 1). Compared to the use of a linear main cutting section, there is less difference of the main cutting section from the ideal blade shape (the ideal would be for all sections of the main cutting section to lie on a single rotation circle), thus improving the squareness of the corners to be cut.

Also, with the insert of the present invention, it can be sufficient for at least one position of the four corners of the upper surface to be formed by combining the main cutting section 6 and the secondary cutting section 7 and the nose corner 12. However, it is also possible as in the insert 1 shown in the example, to form the structure so that the nose sections $9_{-1}$, $9_{-3}$, which are combined from the main cutting section 6 and the secondary cutting section 7 and the nose corner 12, are positioned at diagonal corners. This would result in a structure in which the outline shape does not change when it is turned 180 deg around the center of the insert, thus making it possible to replace the blade by changing the corner and providing an economic advantage.

Figure 7:
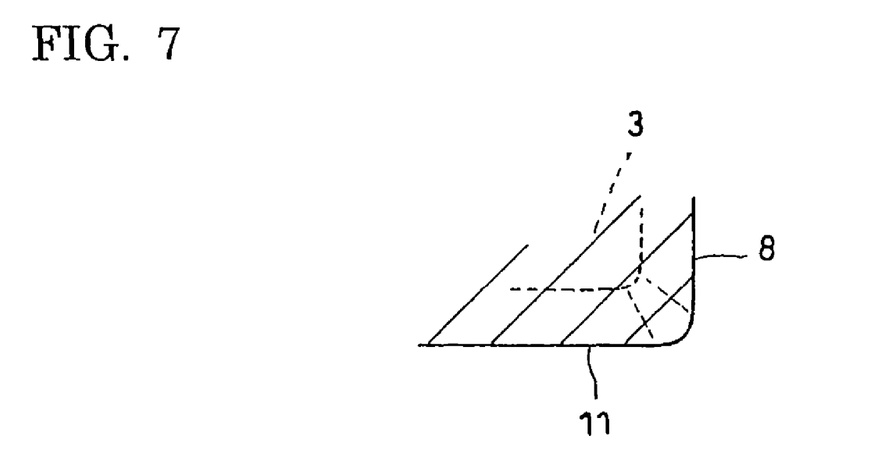
FIG. 7 is a cross-section drawing along the Y-Y line from FIG. 3.

Also, a radial support surface 11 is provided at the lower section of the side surface 4 and is positioned so that it forms essentially a right angle with the axial support surface 8 along the Y-Y cross-section of FIG. 3 (see FIG. 7). The axial support surface 8 and the radial support surface 11 are constrained by the cutter body, increasing the accuracy of the attachment to the cutter body and improving the stability of the attachment. To further improve stability, it would be preferable to form these two support surfaces so that they have as large plane as possible so that the contact area with the cutter body is increased.

Figure 4:
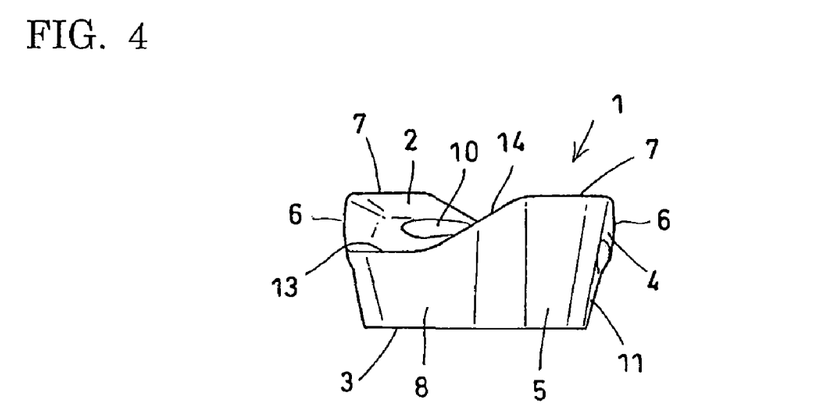
FIG. 4 is an end-view drawing of the insert from FIG. 1.
Figure 5:
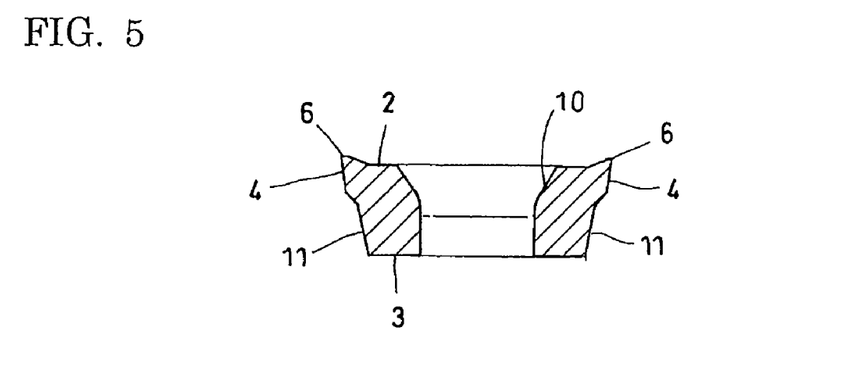
FIG. 5 is a cross-section drawing along the X-X line from FIG. 1.

Furthermore, as shown in FIG. 4, the secondary cutting section 7 and the ridge line 13 at the upper end of the axial support surface 8 connected to the secondary cutting section 7 are parallel to the bottom surface 3 when seen from the end surface of the insert. Also, as shown in FIG. 2, the corners of the upper surface 2 and the bottom surface 3 are in phase with each other (there is no torsion at the corners). As a result, when pressing is performed, pressure is applied in the same direction to all the nose sections (the direction that pressure is applied by the press, i.e., the perpendicular direction). This acts to limit variations in powder density of the nose sections.

It is also possible, if necessary, to provide a chip breaker at the upper surface 2 along the main cutting section 6 and the secondary cutting section 7. Also, the ridge line 14 between the secondary cutting section 7 and the ridge line 13 can function as an intermediate cutting section when the cutter is driven vertically while being driven horizontally.

With the insert of the present invention described above, the essentially right-angle nose sections $9_{-1}$-$9_{-4}$ can be filled with powder uniformly. This reduces variations in dimension changes that take place during sintering. For example, in the case of a parallelogram insert, there is a variation of approximately 0.3% in dimensional changes. In contrast, with the insert having the shape indicated in the embodiment, the variation was reduced considerably, at 0.06%.

Figure 8:
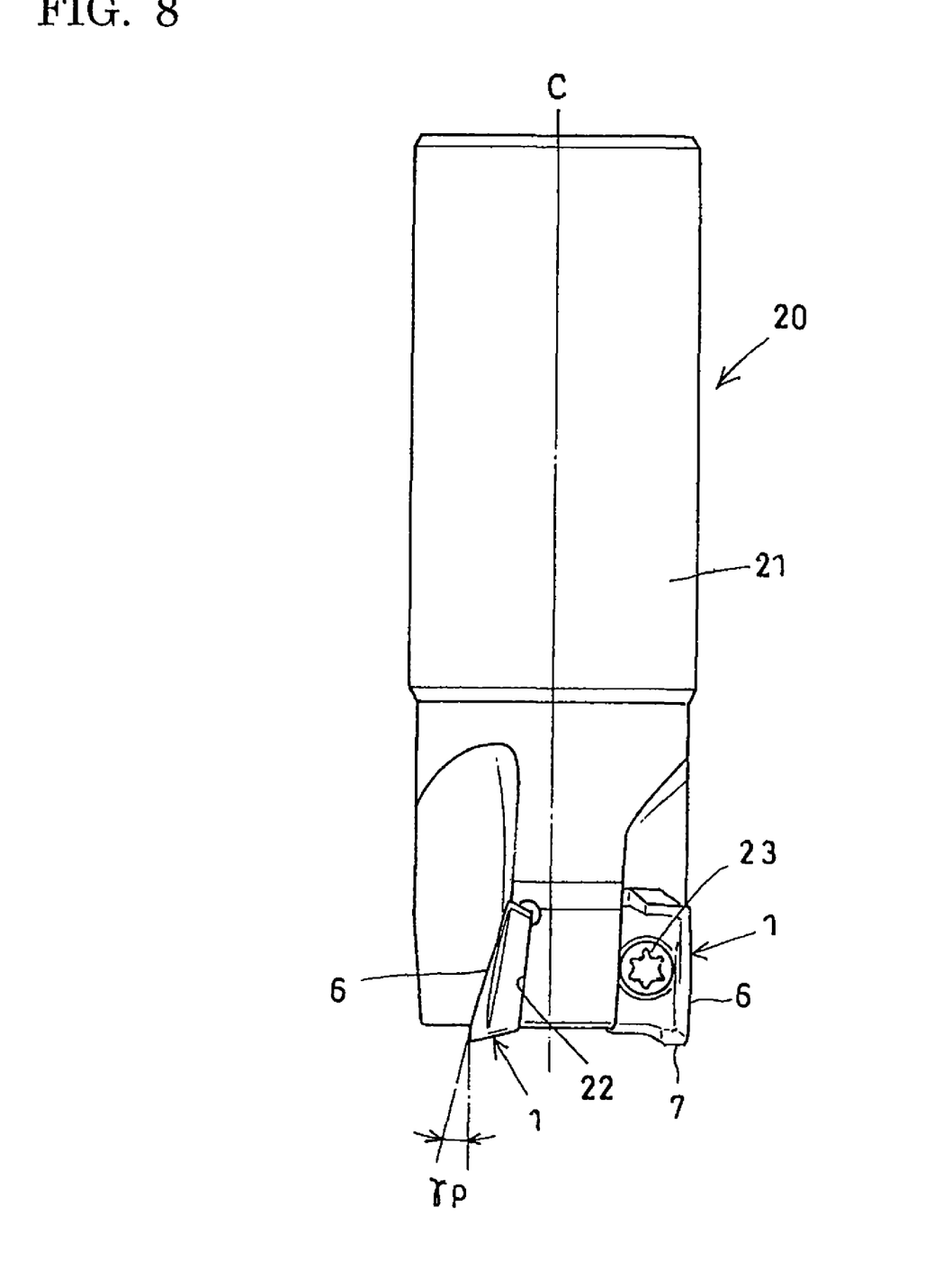
FIG. 8 is a plane-view drawing showing an example of a milling cutter tool according to the present invention.
Figure 9:
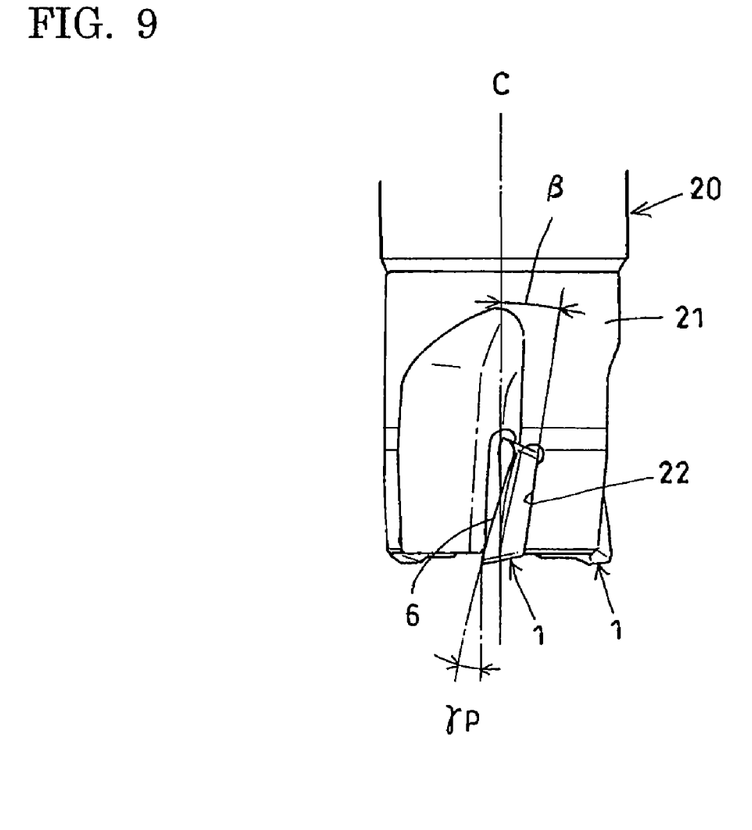
FIG. 9 is a side-view drawing of the cutter from FIG. 8 rotated 90 degrees.
Figure 10:
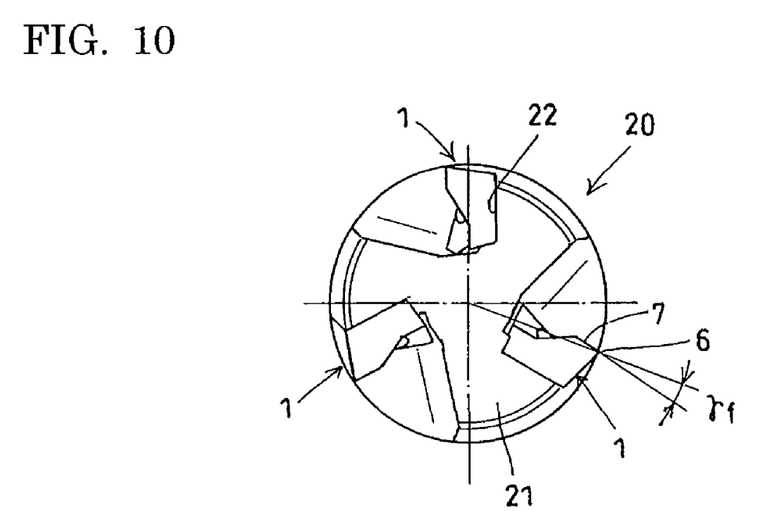
FIG. 10 is a front-view drawing of the cutter from FIG. 8.

Next, referring to FIG. 8 through FIG. 10, an example of a milling cutter 20 that uses a throw-away insert according to the present invention will be described.

The figure shows a cutter body 21. Multiple insert pockets 22 separated by gaps are provided along the outer perimeter of the end of the cutter body 21. The throw-away insert 1 is mounted on the insert pocket 22 by securing it with a clamp screw 23 or the like.

Figure 11:
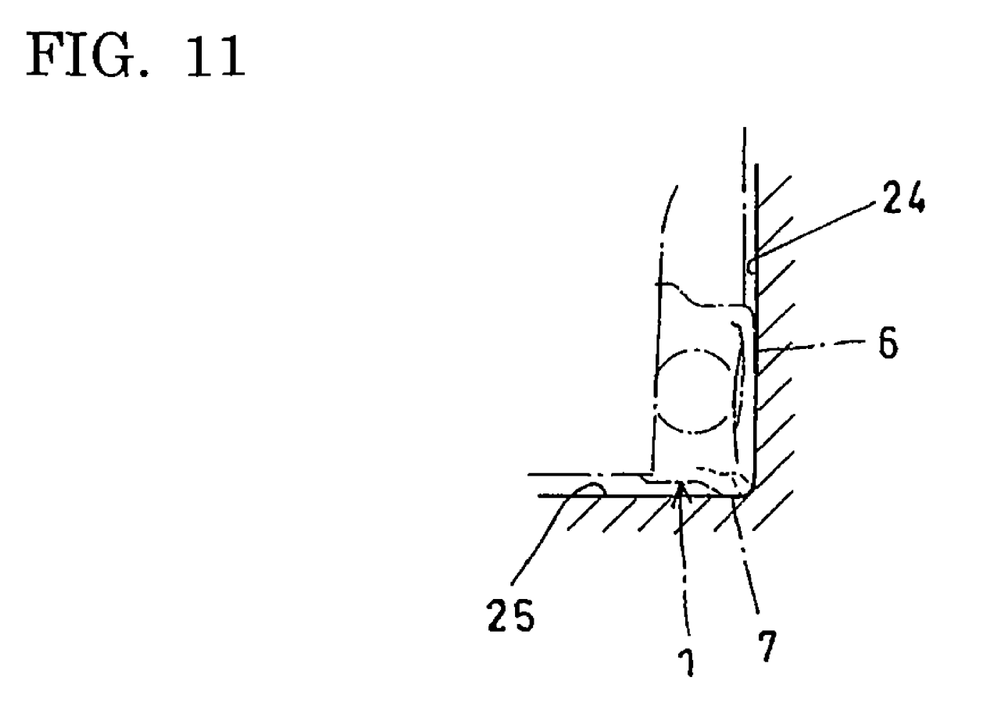
FIG. 11 is a cross-section drawing of a corner cut by a cutter of the present invention.

When this is done, the throw-away insert 1 is mounted on the cutter body 21 so that the secondary cutting section 7 is positioned at the very end, and the main cutting section 6 is positioned furthest out at the outer perimeter. The axial rake $\gamma_p$ shown in FIG. 8 is positive, and the radial rake $\gamma_f$ shown in FIG. 10 is negative. The wall surface (the surface 24 in FIG. 11) of the corner cut by the main cutting section 6 is parallel to the axial center line C, and the bottom surface (the surface 25 in FIG. 25) of the corner cut by the secondary cutting section 7 is roughly perpendicular to the axial center line C of the cutter (the secondary cutting section 7 itself is sometimes oriented at an angle of 1.5 deg or less relative to a line perpendicular to the axial center line of the cutter).

In the throw-away insert 1 shown in the example, the main cutting section 6 is sloped relative to the bottom surface 3 when viewed from the side as in FIG. 3. Thus, a large positive axial rake can be given to the main cutting section 6 without requiring a very large axial slope B (see FIG. 9) for the insert pocket 22 of the cutter body 21.

Also, since the axial support surface 8 formed on the end surface 5 and the radial support surface 11 formed on the side surface 4 of the insert 1 are supported by the insert pocket 22, superior attachment accuracy and support stability is provided for the insert.

Furthermore, the wiper effect provided by the secondary cutting section 7 improves the surface roughness of the bottom surface of the cut corner. Also, since the main cutting section 6 is formed as a curve, corners with a high degree of squareness can be cut.

Also, while the cutter used in the example is an end mill, the present invention can be used in corner mills as well.

What is claimed is:

1. A throw-away insert comprising: an upper surface; a bottom surface formed with four corners; two side surfaces connected to a first set of two parallel sides of said bottom surface; two sloped end surfaces connected to a second set of two parallel sides of said bottom surface; a main cutting section formed from a ridge line positioned at an intersection between said side surface and said upper surface; a secondary cutting section formed from a ridge line positioned at an intersection between said end surface and said upper surface; an axial support surface supported by an insert pocket of a cutter body; and four nose sections formed at corners of said upper surface; wherein: corner angles of said four corners as seen from a plane view of said insert are essentially right angles, and at least one nose section of said four nose sections is formed by combining said main cutting section and said secondary cutting section and a nose corner; said axial support surface is formed from a section of said end surface; said secondary cutting section is parallel with said bottom surface and a ridge line at an upper end of said axial support surface and is projected further along a length axis of said main cutting section than said ridge line at said upper end of said axial support surface; and a radial support surface is positioned at said side surface and is essentially perpendicular to said axial support surface.

2. A throw-away insert according to claim 1 wherein said main cutting section forms a gentle curve and is a curve that expands outward when seen from a plane view.

3. A throw-away insert according to claim 1 wherein, when seen from a plane view of said insert, said nose sections formed by combining said main cutting section and said secondary cutting section and said nose corner have corner angles in a range of 88 deg-91 deg, and said nose sections formed by combining said main cutting section and said ridge line at said upper end of said axial support surface and said nose corner have corner angles in a range of 90 deg-91 deg.

4. A throw-away insert according to claim 1 wherein said nose sections formed by combining said main cutting section and said secondary cutting section and said nose corner are provided at diagonal corners, and an insert outline of said insert stays identical when said insert is rotated 180 deg around a center of said insert.

5. A throw-away insert according to claim 1 wherein said secondary cutting section and said ridge line connected to said secondary cutting section are parallel to said bottom surface when seen from a bottom view of said insert.

6. A throw-away insert according to claim 1 wherein said corners of said upper surface and said corners of said bottom surface are coplanar.

7. A milling cutter with a throw-away insert according to claim 1 mounted in an insert pocket provided at an outer perimeter at an end of a cutter body further comprising: a secondary cutting section positioned at an end; a main cutting section positioned at an outermost perimeter section; a positive axial rake; a negative radial rake; a wall surface of a corner cut by said main cutting section is parallel with an axial center line of said cutter; and a bottom surface of a corner cut by said secondary cutting section is perpendicular to said axial center line of said cutter.

* * * * *